US012709887B2

(12) United States Patent
Skomsøy

(10) Patent No.: US 12,709,887 B2
(45) Date of Patent: Aug. 18, 2026

(54) SEPARATOR FOR WASTEWATER SYSTEM

(71) Applicant: Jets AS, Hareid (NO)

(72) Inventor: Jan Helge Skomsøy, Ålesund (NO)

(73) Assignee: Jets AS, Hareid (NO)

( * ) Notice: Subject to any disclaimer, the term of this patent is extended or adjusted under 35 U.S.C. 154(b) by 703 days.

(21) Appl. No.: 18/014,933

(22) PCT Filed: Jul. 6, 2021

(86) PCT No.: PCT/NO2021/050162
§ 371 (c)(1),
(2) Date: Jan. 6, 2023

(87) PCT Pub. No.: WO2022/010361
PCT Pub. Date: Jan. 13, 2022

(65) Prior Publication Data

US 2023/0349143 A1 Nov. 2, 2023

(30) Foreign Application Priority Data

Jul. 10, 2020 (NO) .................................... 20200816

(51) Int. Cl.
*E03F 5/14* (2006.01)
*B01D 35/02* (2006.01)
(Continued)

(52) U.S. Cl.
CPC ................ *E03F 5/14* (2013.01); *B01D 35/02* (2013.01); *B01D 35/16* (2013.01); *E03F 1/007* (2013.01)

(58) Field of Classification Search
CPC ..... E03F 5/14; E03F 1/007; E03F 1/00; E03F 3/00; E03F 5/00; B01D 35/02; B01D 35/16; B01D 29/13; B01D 29/6484; B01D 29/52; B01D 17/00; B01D 21/00; B01D 29/00; B01D 35/00; B01D 36/00; B01D 2201/00; C02F 2201/004; C02F 2201/005;
(Continued)

(56) References Cited

U.S. PATENT DOCUMENTS 3,152,077 A * 10/1964 Kryzer .................. B01D 35/30 210/233
3,931,012 A * 1/1976 Huse ....................... F23G 7/001 110/221

(Continued)

FOREIGN PATENT DOCUMENTS

CN 105478010 4/2016
CN 208071462 11/2018

(Continued)

OTHER PUBLICATIONS

International Search Report and Written Opinion mailed in PCT/NO2021/050162 on Oct. 5, 2021 (8 pages).

(Continued)

*Primary Examiner* — Ekandra S. Miller-Cruz
(74) *Attorney, Agent, or Firm* — Wissing Miller LLP

(57) ABSTRACT

A separator for separating objects from a liquid flow in a pipe system is disclosed. The separator has a separator housing (4) and at least one filter in the form of a plurality of filter structures (29, 32) extending into the separator housing. The separator may be used in e.g. a vacuum sewage system, a water supply system, 5 or a pipe system for wastewater.

19 Claims, 8 Drawing Sheets

(51) Int. Cl.
*B01D 35/16* (2006.01)
*E03F 1/00* (2006.01)

(58) Field of Classification Search
CPC .... C02F 1/001; C02F 1/00; C02F 3/00; C02F 9/00; C02F 2201/00; C02F 11/00; Y02W 10/00
USPC .......................................................... 210/237
See application file for complete search history.

(56) References Cited

U.S. PATENT DOCUMENTS 4,307,476 A 12/1981 Halstad
4,673,500 A 6/1987 Hoofnagle et al.
5,126,044 A * 6/1992 Magnusson ............. C02F 1/003 210/287
5,256,861 A * 10/1993 Anthony ............. A61M 5/3278 219/390
5,405,530 A 4/1995 Weiler
6,156,192 A 12/2000 Rummler
6,276,552 B1 * 8/2001 Vervisch ................. F16K 35/10 220/315
7,445,123 B1 * 11/2008 Chiou .................... B01D 29/33 210/441
8,550,157 B2 * 10/2013 O'Malley ............. E21B 43/084 166/227
2008/0314838 A1 * 12/2008 Becker ...................... B07B 4/08 210/519
2019/0063027 A1 * 2/2019 Shurtleff .............. B01D 24/007
2019/0329165 A1 10/2019 Backman et al.
2021/0113951 A1 * 4/2021 Oh ......................... B01D 46/71

FOREIGN PATENT DOCUMENTS

| | | |
|---|---|---|
| CN | 209554909 | 10/2019 |
| CN | 110446540 | 11/2019 |
| CN | 110831688 | 2/2020 |
| CN | 210434092 U | 5/2020 |
| DE | 8632305 U1 | 4/1990 |
| EP | 1161292 B1 | 5/2003 |

OTHER PUBLICATIONS

Norwegian Search Report mailed in 20200816 on Feb. 10, 2021 (2 pages).
Extended European Search Report in corresponding European Application No. 21837349.6 mailed Jun. 3, 2024. (7 pages).
International Preliminary Report on Patentability in corresponding International Application No. PCT/NO2021/050162 mailed Jan. 10, 2023. (6 pages).
Search Report mailed in corresponding Chilean Application No. 202300093 mailed on Jan. 8, 2024 (3 pages).
First Office Action in corresponding Chinese Application No. 202180055960.6 mailed Jan. 26, 2026. (15 pages).

* cited by examiner 29
38

42
37

SEPARATOR FOR WASTEWATER SYSTEM

CROSS-REFERENCE TO RELATED APPLICATIONS

This application is a 371 of PCT/NO2021/050162 filed on Jul. 6, 2021, published on Jan. 13, 2022 under publication number WO 2022/010361 A1, which claims priority benefits from Norwegian patent application No. 20200816 filed Jul. 10, 2020, both of which are incorporated herein in their entirety by reference.

INTRODUCTION

The invention concerns a separator, in particular for sewage from toilets, preventing small and large objects from these toilets of causing malfunction, damage or interruption to pumps in a sewage system. The separator may also be used in other pump systems e.g. in sewage treatment systems or water supply systems where clogging of pumps by objects in the flow causes problems.

BACKGROUND

Sewage from toilets may contain small and large objects that are thrown into the toilets and flushed down into the toilet sewage pipes with the flushing water. These objects may cause damage or breakdown to the pumps or clogging of pumps causing system failure resulting in malfunction or stop of the pump and thereby shut-down of the transport of sewage through the pipelines. During shut-down of black water transport through the pipelines, the toiles may not be used which may result in unpleasant and critical sanitary situations e.g. in particular when many people are confined within a limited space such as onboard ships. The objects often thrown into the toilets may e.g. be napkins, tampons, sanitary towels, any kind of small or large sanitary articles, towels, food items, boxes, keys or any other item that could fit into the toilet sewage pipes. Existing solutions for preventing objects from causing damage or clogging to pumps may e.g. include some form of a grid arranged before the pump inlet in the sewage pipe. After some time, the pump or sewage pipe must be opened and the plugs, caused by these objects and biological material in the black water, manually removed e.g. using a spade. Opening, removing these plugs and cleaning the pump/pipe is a dirty and heavy work with considerable health risks involved.

SUMMARY OF THE INVENTION

The invention provides a separator for separating objects from a liquid flow in a pipe system. The separator comprising a separator housing and at least one filter in the form of a plurality of filter structures extending into the separator housing. The separator may further comprise at least one cleaning device provided with cleaning structures corresponding to the filter structures whereby a relative movement between the at least one cleaning device and the filter structures effectuate cleaning of the filter structures.

The at least one cleaning device for cleaning the filter structures may be provided with holes corresponding to the filter structures and adapted for sliding along the filter structures. The filter structures may be projecting into the separator housing at an angle in view of a longitudinal direction of the separator housing. The filter structures may be facing the fluid flow. In an embodiment, the filter structures may be projecting substantially along and facing the fluid flow. The filter structures may be pointed. The at least one cleaning device may be attached to a lid, whereby withdrawal of the lid effectuates movement of the at least one cleaning device along the filter structures. The filter structures may be projecting into the separator housing at an angle in view of a transversal direction of the separator housing. The filter structures may be projecting substantially across the liquid flow. The at least one cleaning device may be attached to a further lid, whereby withdrawal of the further lid effectuates movement of the filter structures through the corresponding holes in the at least one cleaning device. The at least one cleaning device may be provided with openings for throughflow of the liquid flow through the separator. A The cleaning device may further be provided with a scraping edge for cleaning an inside of the separator housing. The separator housing may be provided with at least one opening for objects separated from the liquid flow. The at least one opening may be further be leading into a container for the objects separated from the liquid flow. The container may further be arranged beneath the separator housing. The lids may be provided with handles for manual operation.

In further aspect, the invention provides a separator for separating objects from a liquid flow in a pipe system, the separator comprising a separator housing with an inlet and an outlet for the liquid flow, at least one filter for filtering out objects from the liquid flow, and at least one outlet for objects separated from the liquid flow. The at least one opening may lead into a container for the objects separated from the liquid flow. The separator may further include a sealing and opening device with holes corresponding to the at least one opening for objects separated from the liquid flow and at least one sealing part for liquid-tight sealing of the at least one opening for the objects separated from the liquid flow. The sealing and opening device may be movable between an open position where the at least one hole is arranged under the at least one opening for the objects, and a closed position where the at least one sealing part is arranged under the at least one opening for the objects. The container may include a cardboard box. The cardboard box may be single use and provided with a cardboard lid. The separator may e.g. be used in a vacuum sewage system, a water supply system, or a pipe system for wastewater.

Use of filter structures and cleaning devices with corresponding holes for the filter structures provide a filter system that may be easily and efficiently cleaned for objects and dirty mass. The dirty mass and objects collected by the filter structures inside the separator housing fall down into a waste container that is easily removed from the separator unit. Any use of hands, spades or other tools for digging out the dirty mass from inside the separator is avoided. Avoiding direct handling of the waste by use of hands also reduces the risk of being infected with viruses, bacteria and other contagious substances contained in the organic waste from the wastewater. The ability to clean the inside of the separator housing for objects and dirty mass by pulling out lids on the separator housing and then emptying the separator housing for the objects and dirty mass by simply pulling out drawer-like units under the separator housing provides a clean an efficient cleaning process reducing the time the separator is out of operation. The use of a cardboard box with lid for the transport and disposal of cleaned out objects and dirty mass is also an environmentally friendly solution.

BRIEF DESCRIPTION OF DRAWINGS

Example embodiments of the invention will be described with reference to the following drawings, where.

DETAILED DESCRIPTION

Figure 1:
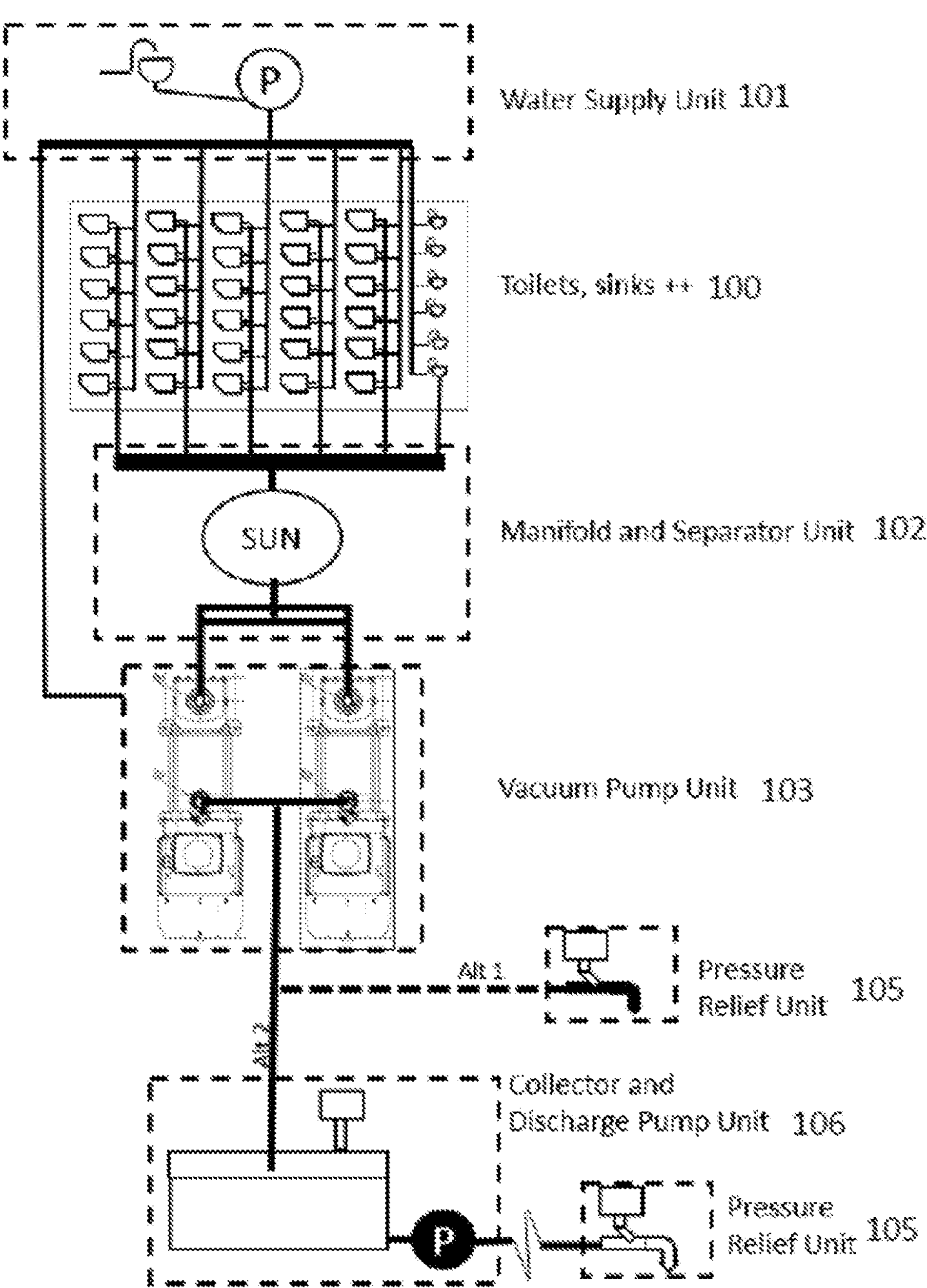
FIG. 1 illustrates a sewage pipe system with manifold and separator units and vacuum pump units transporting wastewater away from a number of toilets, sinks etc to a collector and discharge pump unit.

Example embodiments are described with reference to the drawings. The same reference numerals are used for the same or similar features in all the drawings and throughout the description.

A vacuum toilet system with a sewage pipe system and with separator units and vacuum pump units for transport of the sewage to e.g. storage tanks, a municipal sewage system or a wastewater treating system is shown in FIG. 1. The vacuum toilets and sinks 100 receive water from the water supply 101 and the sewage from the toilets and sinks passes through a separator system 102 where objects are filtered from the sewage before the sewage reaches a vacuum pump unit 103. The sewage is transported further on to a collector and discharge pump unit 106. Pressure relief units 105 may be connected to the sewage pipe system either after the vacuum pump unit or connected to the collector and discharge pump unit. The separator units and vacuum pump units are preferably redundant to avoid shut down of the sanitary system due to system failure and therefore are at least two separator units and pump units connected in parallel. If a pump and/or a separator shuts down, the sewage flow may flow through the other remaining connected separator and pump and further on in the pipe system.

Figures 2A, 2B, 2C:
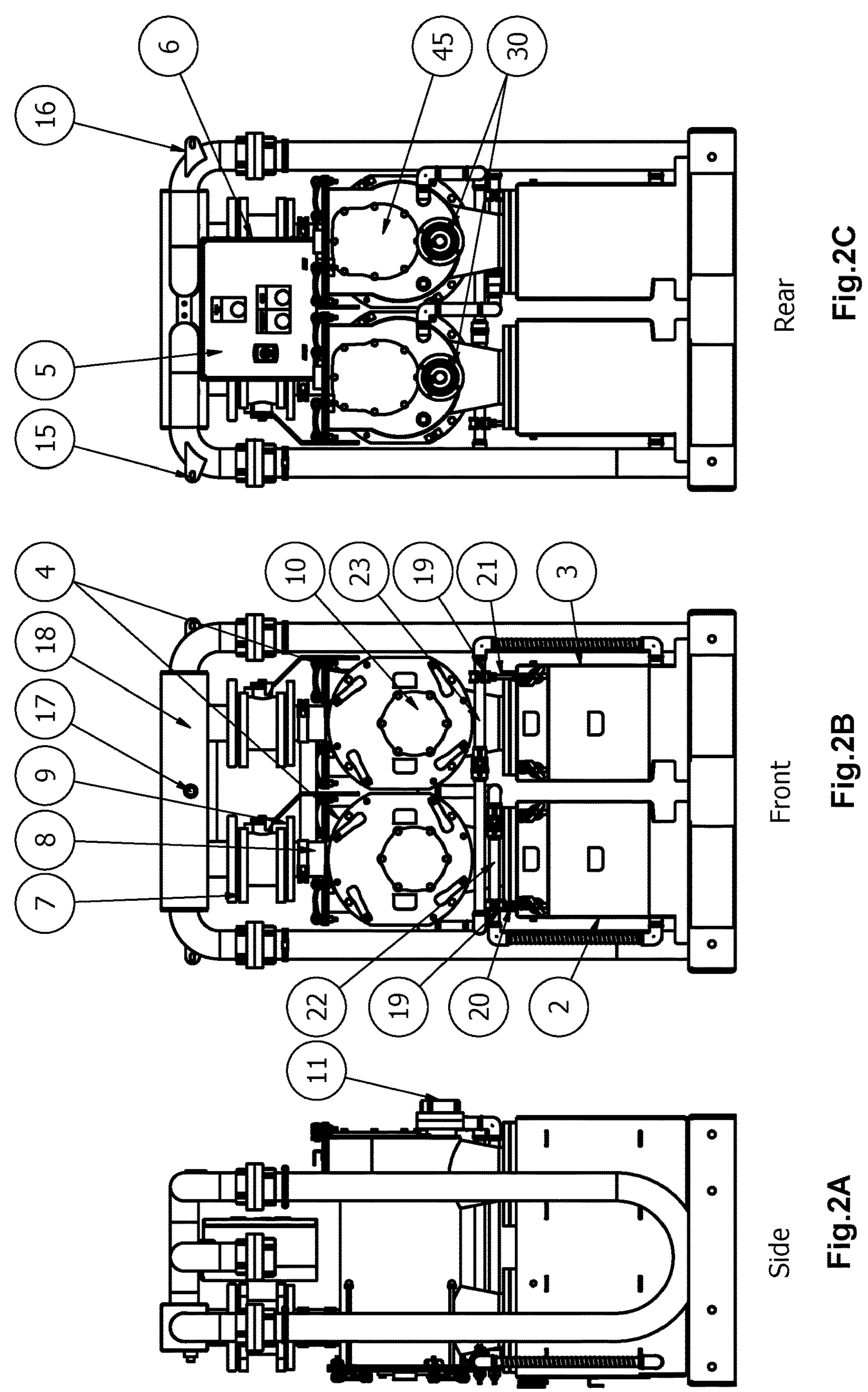
FIGS. 2*a-c* shows a separator system according to an embodiment of the invention seen from the side in FIG. 2*a*, in front view in FIG. 2*b* and in rear view in FIG. 2*c;*

A separator system for separating objects from the liquid flow is shown in FIGS. 2*a-c*; seen from the side in FIG. 2*b*, in front view in FIG. 2*b* and in rear view in FIG. 2*c*. The separator system in FIGS. 2*a-c* shows a manifold 18 leading liquid into two separator units 24, 26 arranged in parallel. The liquid flows through the manifold 18 and into a separator housing 4 through an inlet 25 and flows further on through the separator housing where objects are separated out from the liquid flow. The liquid flow flows out from the separator housing through an outlet on the rear side of the separator housing 4. The outlet is provided with couplings 11 for connecting to pipes further on to the vacuum pump unit. The inlet and outlet of the separator housing is provided with a valve 7 (outlet valve not shown). Before cleaning of the separator, the valves on each side of the separator housing are closed. Other configurations of the inlet, outlet and valves may be envisaged. The manifold 18 may be attached to a frame structure (not shown) with manifold hangers 15, 16 and connected to the separator unit through flanges 9 and compensators 8. The manifold is provided with a drain plug 17. An electrical cabinet 5 for control of the valves is attached to a frame 6. The separator housings 4 may be drained for liquid through drainpipes 22, 23 attached to the structure via pipe clamps 19, 20, 21.

Figure 5:
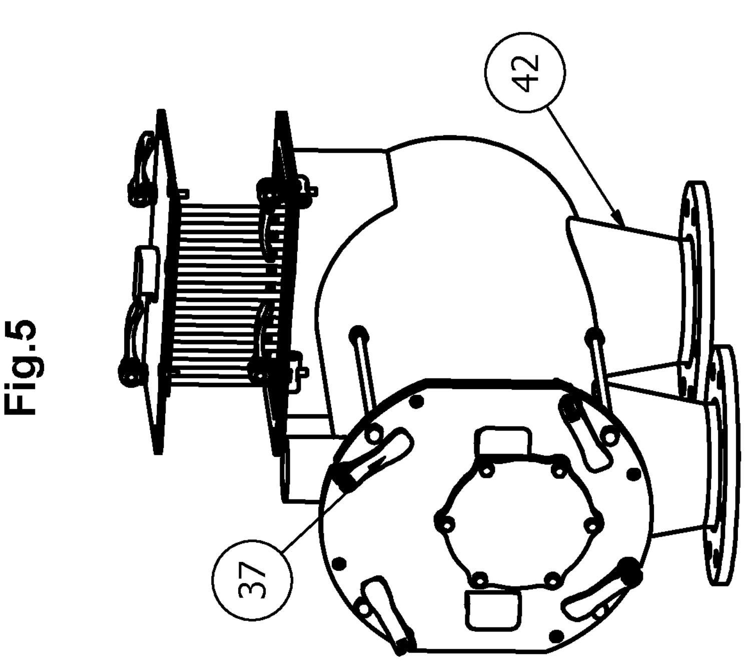
FIG. 5 shows the separator from FIG. 4 in partly front view with a fine filter structure in a withdrawn position.

The separator housing 4 may be provided with a front lid 10 for inspecting and cleaning the inside of the separator housing. The lid may be attached to the separator housing with quick-release clamps 37 (FIG. 5) and provided with handles, facilitating manual handling. The lid may however also be mounted to the separator with bolts and nuts. A gasket 33 ensures a watertight connection between the separator housing and a flange of the lid 10. The lid 10, but also the rear part of the separator housing 4 may be provided with a transparent part 45 for visual inspection of the inside of the separator housing. Objects filtered out from the liquid flow in the separator housing fall down into a container 31 provided beneath the separator housing. The container 31 for objects, may be arranged under the separator housing 4 as shown in FIGS. 2*a-c*, but the container 31 may also be arranged in other positions beneath the separator housing 4.

Figure 3B:
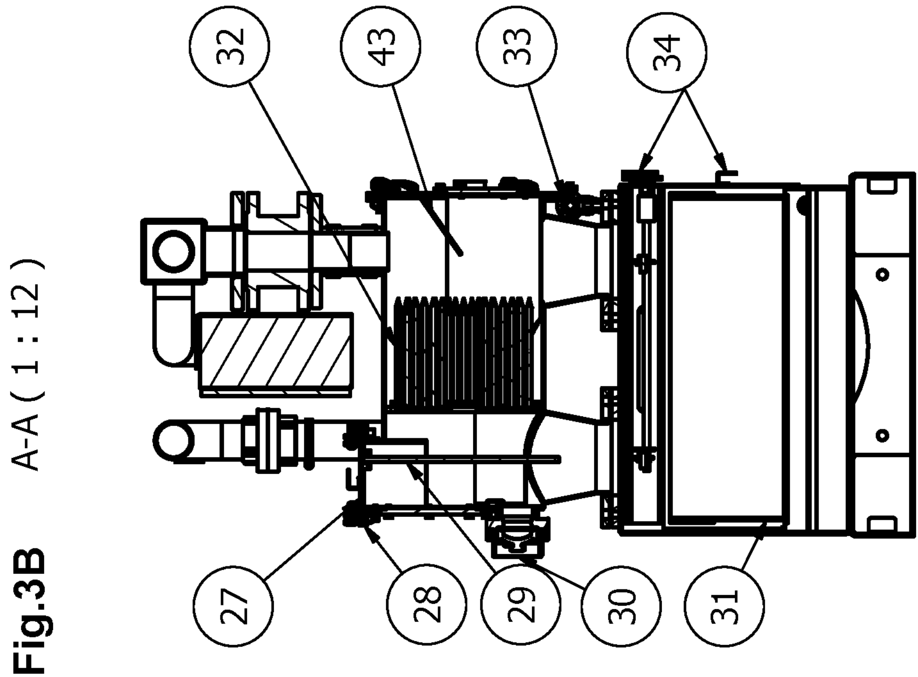
FIG. 3*a* shows a front view and FIG. 3*b* a section view along A-A from the side of a separator system for separating objects from a liquid flow according to an embodiment of the invention.
FIG. 3*c* shows the separator system from FIGS. 3*a* and 3*b* showing a lid with filter structures, a waste container and a sealing and opening device in a withdrawn position for illustration purposes.
Figure 3A:
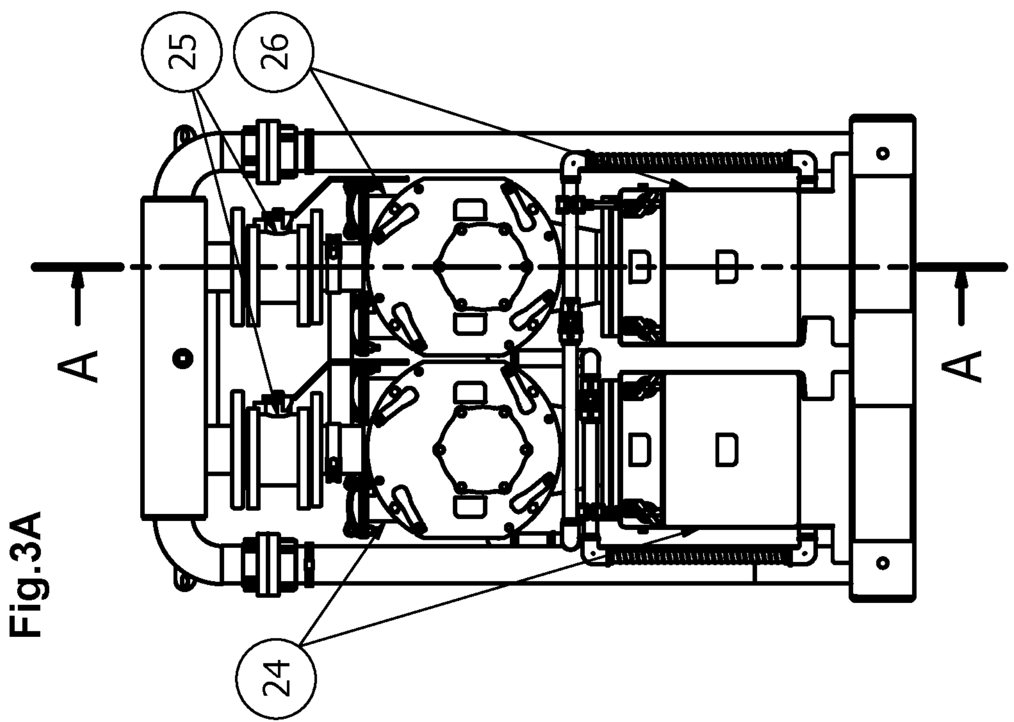

FIG. 3*a* shows a front view and FIG. 3*b* a view from the side of a separator system for separating objects from the liquid flow. The inlet structures 25 with valves leading into the separator housings are shown in FIG. 3*a*. The liquid flow flows into the separator housing 4 in the front upper part of the separator, continue downwards into the separator housing and then flows along and through the separator housing in the longitudinal direction of the housing and out of the outlet 30 in the rear part of the separator. The separator housing in the embodiment shown in FIGS. 3*a,b,c* have a cylindrical shape. The separator housing may however also have other shapes e.g. oval, rectangular; quadratic etc depending on the actual use and environment where the separator unit is to be placed.

Figure 4:
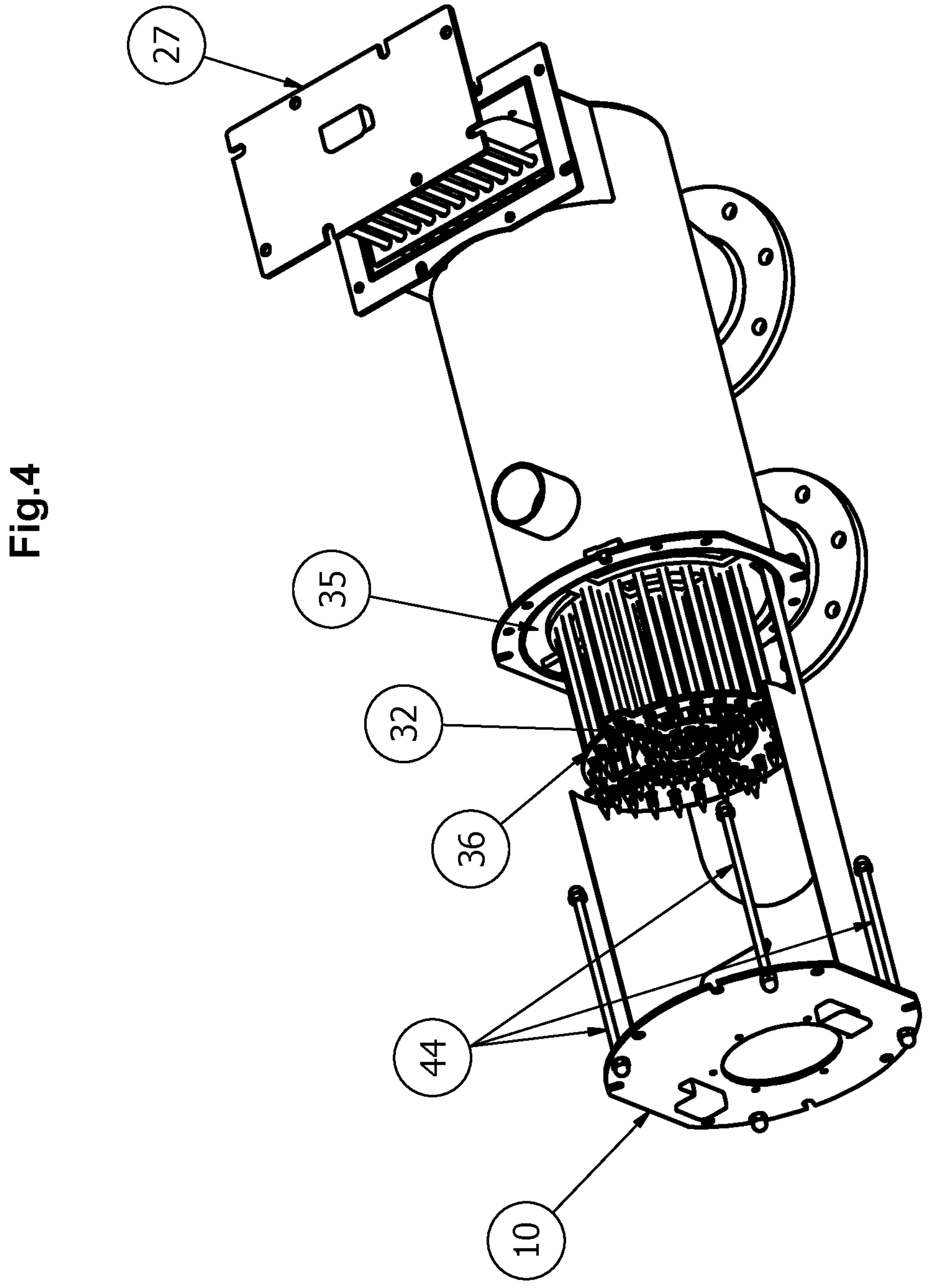
FIG. 4 is a partly exploded view of a separator with filter structures exposed in a withdrawn position according to an embodiment of the invention.
Figure 6:
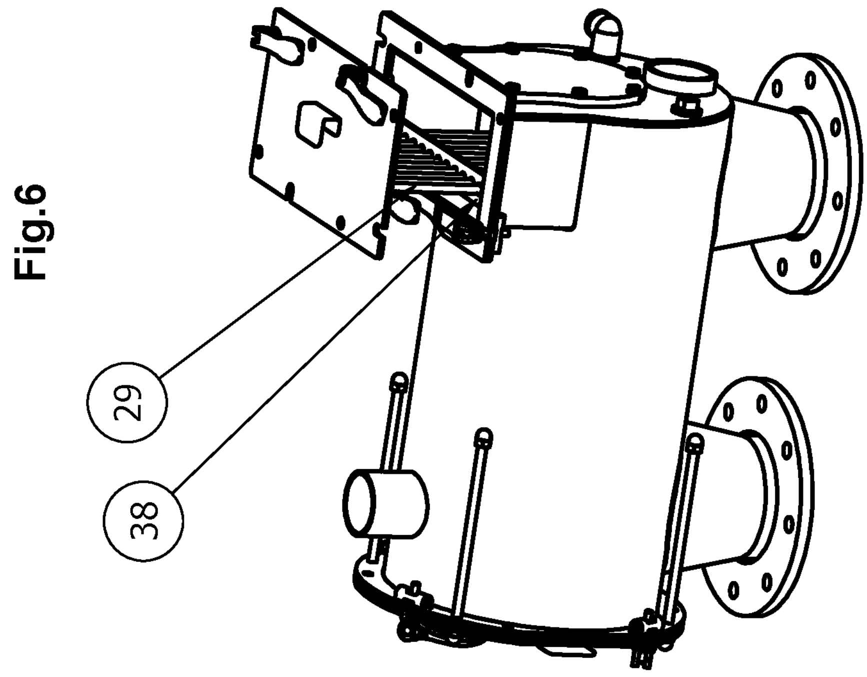
FIG. 6 shows the separator from FIG. 5 partly from above illustrating the fine filter structure and interaction with a plate for removal of objects from the fine filter structure.

FIG. 3*b* is a side view of the separator unit through sections A-A of FIG. 3*a*. The inside of the separator housing has filters 29, 32 for catching objects in the liquid flow. The filters extend into the separator housing. A first filter in the form of filter structures 32 extend into the separator housing. The filter structures 32 are in FIG. 3*b* arranged along a longitudinal direction of the separator housing facing the liquid flow. When liquid flows through the inside of the separator housing, objects in the liquid flow are caught by the filter structures 32. The first filter structures may also be arranged at an angle to the liquid flow. The angle may vary depending upon the separator construction and the liquid flow path through the separator and liquid flow parameters as e.g. speed and flow rate. The first filter structures are preferably pointed to enable piercing of the large objects in the liquid flow. The first filter serves as a coarse filter filtering out larger objects from the liquid flow as e.g. diapers, sanitary articles, tampons, towels etc. The first filter structures 32 are arranged in a pattern covering the longitudinal internal cross section of the separator housing 4 to ensure that as much as possible of the liquid flow passes these filter structures. The first filter structures 32 are attached to a cleaning device, e.g. a base plate 35 (FIG. 4), provided with openings for throughflow of the liquid flow. In FIG. 4, the base plate 35 is attached to the inside of the separator housing. The objects that are stopped, but not pierced by the filter structures, may fall into the bottom of the separator housing.

A guiding plate 43 for the liquid flow may be arranged inside the separator housing under the inlet 25 for steering the liquid flow from the downwards direction and into the longitudinal direction towards the filter structures. The combination of the free fall of the liquid flow into the separator housing through the inlet 25 and the guiding plate 43, results in the liquid flow hitting the first filter structures 32 at higher speed increasing the chance of larger objects to be pierced by the first filter structures 32.

The liquid flow with objects small enough to pass the first filter structures 32 are caught by a second filter structure 29 behind the first filter structure 32. In the embodiment shown in FIGS. 3*a,b,c*, the second filter structures 29 extend down into the separator housing across the liquid flow in the rear part of the separator housing. Smaller objects as keys, rings etc. in the liquid flow hit the second filter structure 29 and fall down into the bottom part of the separator housing. Small lighter objects may also stick to the second filter structure without falling down. The second filter structures may also be arranged at an angle to the liquid flow and/or an angle in view of a transversal direction of the separator housing. The angle may vary depending upon the separator construction and the liquid flow path through the separator and liquid flow parameters as e.g. speed and flow rate.

Figure 7B:
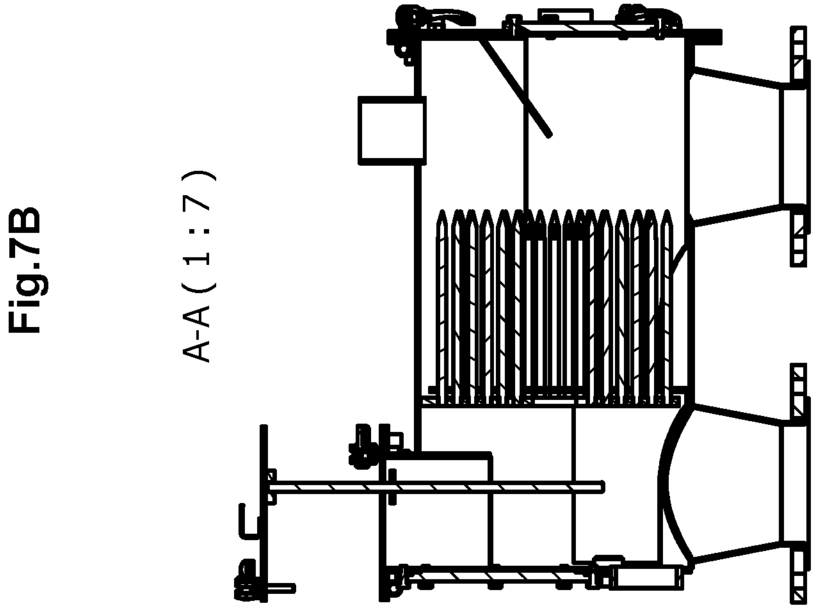
FIG. 7*b* a view through section B-B of FIG. 7*a* showing coarse filter structures inside the separator.
Figure 7A:
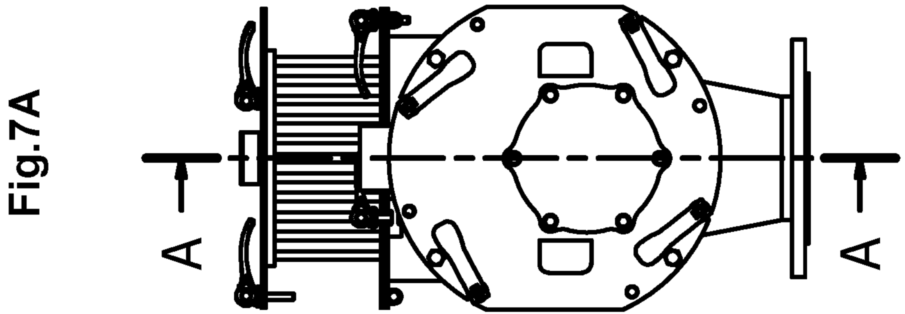
FIG. 7*a* is a front view of FIG. 6.

The first 32 and second 28 filter structures are attached to respective lids 10, 27 for cleaning of objects and dirty mass from the filter structures by movement of the lids. The first filter structures 32 interact with a cleaning device 36 provided with holes corresponding to the size and shape of the first filter structures as shown in FIG. 4. As can be seen from FIGS. 4, 5, 6 and 7 the second filter structures 29 interacts with a second cleaning plate 38 provided with holes corresponding to the size and shape of the second filter structures. A relative motion between the filter structures 29, 32 and the respective cleaning devices 36, 38 effectuates cleaning of the filter structures 29, 32. The first and second filter structures may be elongated filter structures in the form of e.g. needle-, rod-, stick- or finger-like structures, extending into the interior volume of the separator housing. The filter structures may be parallel with each other. The first 32 and second 29 filter structures may be arranged substantially perpendicular to each other as shown in FIGS. 7*a, b*.

A gasket 28 ensures a watertight connection between the separator housing and the lid 27. The lid 27 may be attached to the separator housing with e.g. quick-release clamps 37 and provided with handles, facilitating manual handling.

The first 32 and second 29 filter structures are shown in FIG. 4 in a partly exploded view. In FIG. 4, the withdrawable lid 10 for the first filter structure 32 is attached to a front of a half-pipe structure which has at its rear end the cleaning device 36 in the form of a plate with holes corresponding to the filter structures. The half-pipe structure and the outer shape of the cleaning device 36 corresponds to the size and shape of at least the lower half of the inside of the separator housing. The cleaning device 36 is provided with openings for throughflow of liquid. When the separator is in use connected into the liquid flow, the cleaning device 36 bears against the base plate 35 to which the filter structures are attached. In FIG. 4 the cleaning device 36 has been pulled out sliding over the filter structures by an outward pulling movement of the lid 10 from the separator housing. The cleaning device 36 may be provided with a scraping edge for scraping along an inside of the separator housing for cleaning of the separator housing. The lid 10 may be provided with guides 44 guiding along the outside of the separator housing to ease sliding and steering of the half-pipe structure and cleaning device without causing too much load on the filter structures, cleaning device and half-pipe structure.

Figure 3C:
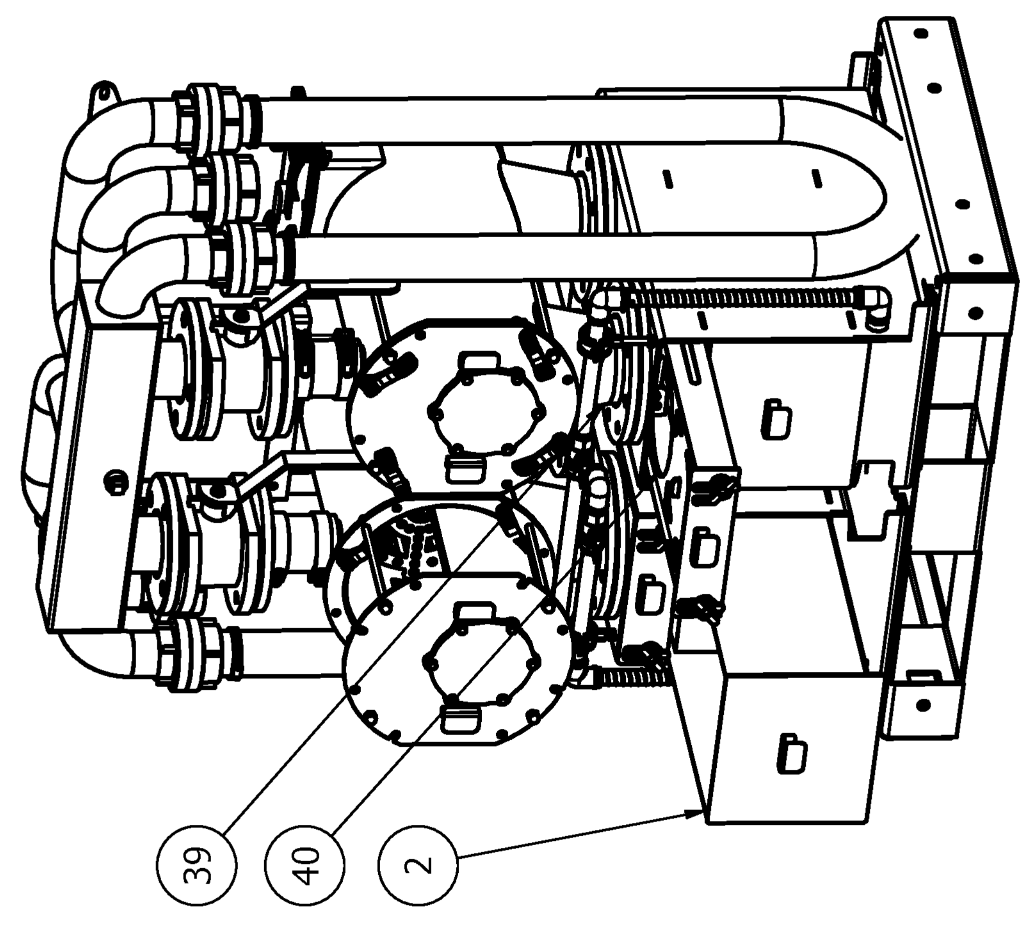
Figure 8:
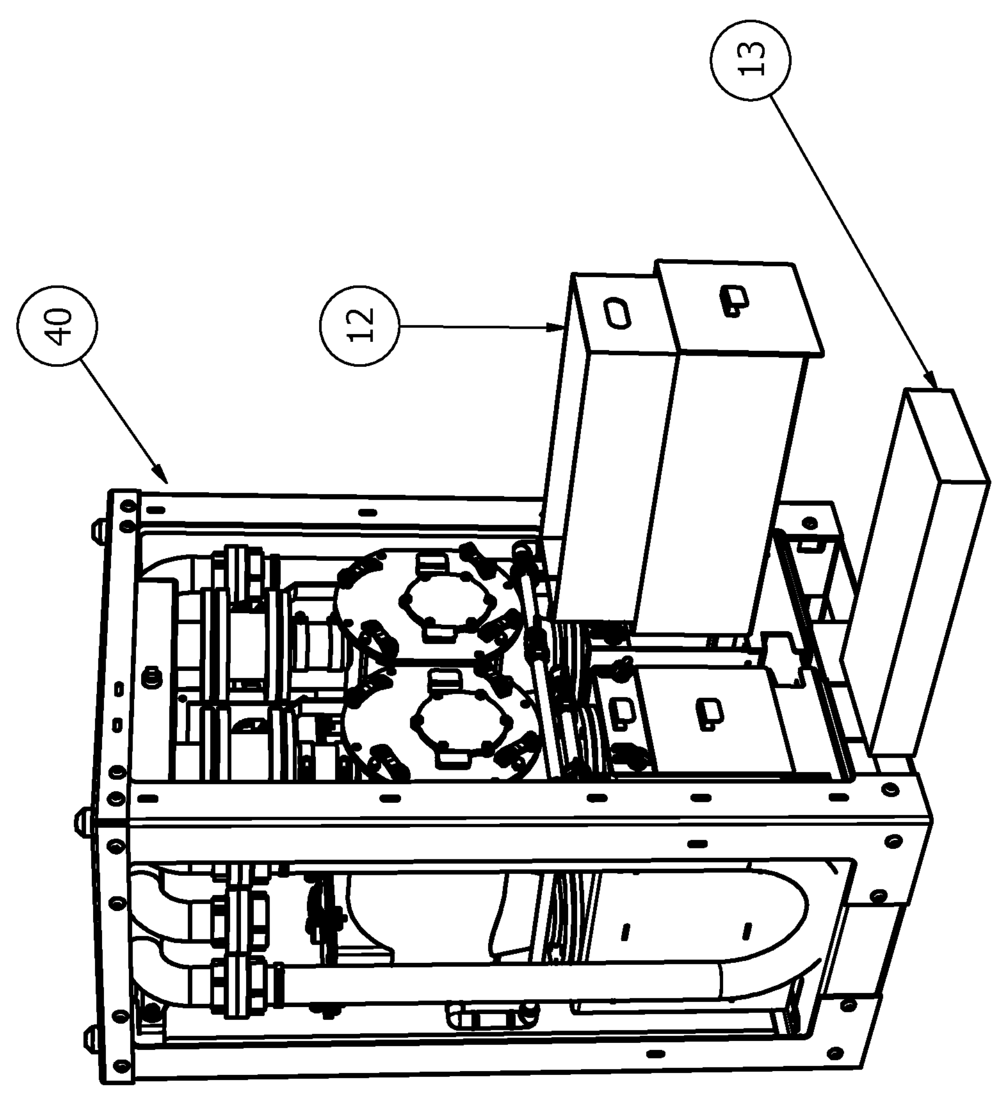
FIG. 8 shows a separator system with a withdrawn waste container with a removable cardboard box inside.

The objects cleaned from the first filter structures fall down and through an opening in the bottom of the half-pipe structure and further through an opening for objects in the separator housing in front of the first filter structure 32 and down into a first funnel 39. The bottom of the separator housing also has an outlet beneath the second filter structure leading into a second funnel 42 collecting the objects caught by the second filter 29. A sealing and opening device 40 with filter seals for liquid-tight sealing of the bottom of the funnels 39 and 42 when the separator is in use, is arranged under the separator housing. When the funnels 39, 42 are to be emptied for objects caught by the filters, the sealing and opening device is moved to an open position whereby corresponding through-going holes are positioned under the outlets of the first and second funnel 39 and 42. Stoppers are provided for stopping the sealing and opening device in the correct position for opening and sealing of the funnels. A front through-going hole 40 is visible in the partly exploded view of FIG. 3*c*. The funnels and through-going holes lead, when the sealing and opening device is in the open position, into a container 31 for the objects. The container 31 may include a removable box 12, e.g. a cardboard box 12. The cardboard box is provided with a layer on the inside to withstand liquid. Liquid/moisture in the objects and dirty mass inside the cardboard box may flow out through holes in the bottom of the cardboard box leaving a dry dirty mass with objects easier and more hygienic to handle. The liquid is collected in the bottom of the container 31 which may be provided with a drainpipe for the liquid. The cardboard box may also be provided with a lid 13 as shown in FIG. 8 for easy closing and transport of the cardboard box and content to a waste station. The cardboard box is preferably single use and replaced by a new cardboard box when a full cardboard box is removed from the waste container 31.

The waste container 31 and the sealing and opening device 40 may be arranged in a drawer housing assembly 2, 3, where the sealing and opening device constitutes an upper drawer device and the waste container 31 constitutes a lower drawer device. The upper and lower drawer device may be provided with handles 34 for manual operation as shown in FIG. 3*b*. When the funnels 39, 42 are to be emptied for objects caught by the filters, the upper drawer device is pulled out to an open position whereby corresponding through-going holes are positioned under the bottom of the first and second funnel 39 and 42. The waste container is pulled out and the cardboard box removed and replaced before the lower drawer device and upper drawer device are pushed back into the drawer housing assembly.

When the separator is to be emptied and cleaned, the inlet and outlet valves are closed off manually. When the valves are safely closed, the lids 10, 27 are opened and pulled out away from the separator housing. The cleaning devices 36, 38 with holes corresponding to the filter structures are then pulled over the filter structures and any waste including any objects, biological waste and dirty mass will be cleaned off the filters and fall into the bottom of the separator housing and further down into the funnels. The handles on the outside of the withdrawable lid enables easy opening and cleaning of the filter structures attached to the inside of the lid, in one and the same movement. When the sealing and opening device is pulled out, the dirty mass and objects will fall down in the waste container 31 from the funnels and through-going holes 40. The container may be a single use cardboard box 12. The cardboard box is removed and closed by the cardboard lid 13. A new cardboard box is inserted in the lower drawer device and the lower drawer device and upper drawer device firmly pushed in. The withdrawable lids for the first and second filters are securely fastened before the valves are opened again for the liquid flow.

The cleaning of the filter structures and emptying of the separator housing and funnels may also be done automatically or semi-automatically.

The separator with filter structures and cleaning device for cleaning the filter structures enables easy cleaning of the filters by pulling the handles of the lids. Also removing the objects and dirty mass cleaned from the filter structures are easily removed from the separator by pulling handles of a drawer like device opening the seals beneath the funnels. Collecting and removal of the objects and waste cleaned therefrom may be done without the need of using any tool and manually digging out the waste from inside the separator. Use of cardboard box with holes for outlet of liquid leaves a dry mass more hygienic and easy to handle. The cardboard box with lid is easy to replace and transport to a waste station for disposal of both the waste and the box.

The separator may be used in e.g. a sewage pipe system, a vacuum sewage system, e.g. onboard boats, airplanes, trains, or in a water supply system, removing objects from the fluid flow avoiding clogging of the pipes and/or pumps and thus avoiding shutdown of the sewage system. If two separators are connected in parallel, one separator may be disconnected and cleaned at a time without shutting down the sewage system. Although the embodiments of the separator system shown in the drawings have two separator units arranged in parallel, sewage systems may only be provided with one separator unit, e.g. in sewage systems that are not so critical and/or where a shut-down may be tolerated. In case of only one separator unit, the manifold may be simplified as only one separator unit is connected to the pipeline. In case of only one separator unit, a bypass pipe may also be provided to pass the sewage flow passed the separator unit when the separator unit needs to be cleaned or serviced.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A separator for separating objects from a liquid flow in a pipe system, wherein the liquid flow is wastewater from a vacuum sanitary system, the separator comprising:

a separator housing with an inlet and an outlet for the liquid wastewater flow, and at least one opening for objects separated from the liquid flow; and at least one filter adapted to catch objects in the wastewater, the at least one filter comprising a plurality of elongated filter structures in the form of rod-shaped structures attached to a base plate provided with openings for throughflow of the liquid flow of wastewater, the filter structures extending from the base plate into the separator housing such that a pointed end of each filter structure faces the liquid flow of wastewater enabling piercing of the objects in the liquid flow of wastewater.

2. The separator according to claim 1, further comprising at least one cleaning device provided with cleaning structures corresponding to the filter structures, wherein a relative movement between the at least one cleaning device and the filter structures effectuate cleaning of the filter structures.

3. The separator according to claim 2, wherein the at least one cleaning device is provided with holes corresponding to the filter structures and adapted for sliding along the filter structures.

4. The separator according to claim 1, wherein the filter structures are projecting into the separator housing at an angle in view of a longitudinal direction of the separator housing.

5. The separator according to claim 1, wherein the filter structures are projecting into the separator housing at an angle in view of a transversal direction of the separator housing.

6. The separator according to claim 1, wherein the filter structures are projecting substantially across the liquid flow.

7. The separator according to claim 2, wherein the at least one cleaning device is attached to a first lid, whereby withdrawal of the lid effectuates movement of the at least one cleaning device along the filter structures.

8. The separator according to claim 7, wherein the at least one cleaning device is attached to a second lid, whereby withdrawal of the second lid effectuates movement of the filter structures through the corresponding holes in the at least one cleaning device.

9. The separator according to claim 8, wherein the second lid is provided with handles for manual operation.

10. The separator according to claim 2, wherein the at least one cleaning device is provided with openings for throughflow of the liquid flow through the separator.

11. The separator according to claim 2, wherein the at least one cleaning device is provided with a scraping edge for cleaning an inside of the separator housing.

12. The separator according to claim 1, wherein the separator housing is provided with at least one opening for objects separated from the liquid flow, the at least one opening leading into a container.

13. The separator according to claim 12, wherein the container is arranged beneath the separator housing.

14. The separator according to claim 7, wherein the first lid is provided with handles for manual operation.

15. The separator according to claim 1, wherein the at least one opening leading into a container for the objects separated from the liquid flow.

16. The separator according to claim 15, wherein the container is arranged beneath the separator housing.

17. The separator according to claim 1, further comprising a sealing and opening device with at least one hole corresponding to the at least one opening for objects separated from the liquid flow and at least one sealing part for liquid-tight sealing of the at least one opening for the objects separated from the liquid flow.

18. The separator according to claim 17, wherein the sealing and opening device is movable between an open position where the at least one hole is arranged under the at least one opening for the objects, and a closed position where the at least one sealing part is arranged under the at least one opening for the objects.

19. The separator according to claim 15, wherein the container comprises a cardboard box.

* * * * *